United States Patent
Meier et al.

(10) Patent No.: US 6,425,074 B1
(45) Date of Patent: Jul. 23, 2002

(54) METHOD AND APPARATUS FOR RAPID EXECUTION OF FCOM AND FSTSW

(75) Inventors: Stephan G. Meier, Sunnyvale; Norbert Juffa; Frederick D. Weber, both of San Jose; Stuart F. Oberman, Sunnyvale, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/393,524

(22) Filed: Sep. 10, 1999

(51) Int. Cl.[7] .......................... G06F 9/302; G06F 9/305; G06F 7/38; G06F 9/44

(52) U.S. Cl. ................ 712/222; 712/228; 712/245; 712/217; 708/495; 708/525; 708/501; 708/204; 711/123

(58) Field of Search .................... 712/222, 239, 712/224, 244, 228, 221, 235, 200, 34, 226, 223, 217, 218, 219, 245, 210, 4; 708/525, 204, 495.671, 501, 505; 711/217, 123, 100, 126; 710/65; 707/522, 523

(56) References Cited

U.S. PATENT DOCUMENTS 5,764,548 A * 6/1998 Keith et al. .................. 708/495
5,867,413 A * 2/1999 Yeh .............................. 708/501

OTHER PUBLICATIONS

*Intel Architecture Software Developer's Manual*, vol. 2: Instruction Set Reference, 1997, Chapter 3, pp. 105–114 and pp. 178–182.

* cited by examiner

*Primary Examiner*—Daniel H. Pan
(74) *Attorney, Agent, or Firm*—Conley, Rose & Tayon, PC; B. Noël Kivlin

(57) ABSTRACT

A microprocessor configured to rapidly execute floating point store status word (FSTSW) type instructions that are immediately preceded by floating point compare (FCOM) type instructions is disclosed. FCOM-type instructions are modified to store their results to an architectural floating point status word and a temporary destination register. If an FSTSW-type instruction is detected immediately following an FCOM-type instruction, then the FSTSW-type instruction is transformed into a special fast floating point store status word (FSTSWEF) instruction. Unlike the FSTSW-type instruction, which is serializing and negatively impacts performance, the FSTSWEF instruction is not serializing and allows execution to continue without undue serialization. A computer system and method for rapidly executing FSTSW instructions immediately preceded by FCOM-type instructions are also disclosed.

20 Claims, 7 Drawing Sheets

METHOD AND APPARATUS FOR RAPID EXECUTION OF FCOM AND FSTSW

BACKGROUND OF THE INVENTION

1. Field of the Invention

This invention relates generally to the field of microprocessors and, more particularly, to floating point units within microprocessors.

2. Description of the Related Art

Most microprocessors must support multiple data types. For example, x86-compatible microprocessors must execute two types of instructions; one set defined to operate on integer data types and another set defined to operate on floating point data types. In contrast with integers, floating point numbers have fractional components and are typically represented in exponent-significant format. For example, the values $2.15H10^3$ and $-10.5$ are floating point numbers while the numbers $-1$, 0, and 7 are integers. The term "floating point" is derived from the fact that there is no fixed number of digits before or after the decimal point, i.e., the decimal point can float. Using the same number of bits, the floating point format can represent numbers within a much larger range than integer format. For example, a 32-bit signed integer can represent the integers between $-2^{31}$ and $2^{31}-1$ (using two's complement format). In contrast, a 32-bit ("single precision") floating point number as defined by the Institute of Electrical and Electronic Engineers (IEEE) Standard 754 has a range (in normalized format) from $2^{-126}$ to $2^{127} \times (2-2^{-23})$ in both positive and negative numbers.

FIG. 1 illustrates an exemplary format for an 8-bit integer 100. As the figure illustrates, negative integers are represented using the two's complement format 106. To negate an integer, all bits are inverted to obtain the one's complement format 102. A constant 104 of one is then added to the least significant bit (LSB).

FIG. 2 shows an exemplary format for a floating point value. Value 110 is a 32-bit (single precision) floating point number. Value 110 is represented by. a significant 112 (23 bits), a biased exponent 114 (8 bits), and a sign bit 116. The base for the floating point number (2 in this case) is raised to the power of the exponent and multiplied by the significand to arrive at the number represented. In microprocessors, base 2 is most common. The significand comprises a number of bits used to represent the most significant digits of the number. Typically, the significand comprises one bit to the left of the radix point and the remaining bits to the right of the radix point. A number in this form is said to be "normalized". In order to save space, in some formats the bit to the left of the radix point, known as the integer bit, is not explicitly stored. Instead, it is implied in the format of the number.

Floating point values may also be represented in 64-bit (double precision) or 80-bit (extended precision) format. As with the single precision format, a double precision format value is represented by a significand (52 bits), a biased exponent (11 bits), and a sign bit. An extended precision format value is represented by a significand (64 bits), a biased exponent (15 bits), and a sign bit. However, unlike the other formats, the significand in extended precision includes an explicit integer bit. Additional information regarding floating point number formats may be obtained in IEEE Standard 754.

The recent increased demand for graphics-intensive applications (e.g., 3D games and virtual reality programs) has placed greater emphasis on a microprocessor's floating point performance. Given the vast amount of software available for x86 microprocessors, there is particularly high demand for x86-compatible microprocessors having high performance floating point units. Thus, microprocessor designers are continually seeking new ways to improve the floating point performance of x86-compatible microprocessors. While some x86 floating Point instructions perform arithmetic (e.g., FADD which adds two floating point numbers), other floating point instructions perform logic functions. For example, the instruction FCOM performs a comparison of two real values. Other examples of x86 floating point instructions that perform compares are FTST (compares top of stack with zero) and FICOM (compare integer). Still other x86 floating point instructions perform control functions. For example, the instruction FSTSW stores the floating point unit's architectural status word to a specified destination (e.g., memory or the integer register AX).

One technique used by microprocessor designers to improve the performance of all floating point instructions is pipelining. In a pipelined microprocessor, the microprocessor begins executing a second instruction before the first has been completed. Thus, several instructions are in the pipeline simultaneously, each at a different processing stage. The pipeline is divided into a number of pipeline stages, and each stage can execute its operation concurrently with the other stages. When a stage completes an operation, it passes the result to the next stage in the pipeline and fetches the next operation from the preceding stage. The final results of each instruction emerge at the end of the pipeline in rapid succession.

Another popular technique used to improve floating point performance is out-of-order execution. Out-of-order execution involves reordering the instructions being executed (to the extent allowed by dependencies) so as to keep as many of the microprocessor's floating point execution units as busy as possible. As used herein, a microprocessor may have a number of execution units (also called functional units), each optimized to perform a particular task or set of tasks. For example, one execution unit may be optimized to perform integer addition, while another execution unit may be configured to perform floating point addition.

Typical pipeline stages in a modern microprocessor include fetching, decoding, address generation, scheduling, execution, and retiring. Fetching entails loading the instruction from the instruction cache. Decoding involves examining the fetched instruction to determine how large it is, whether or not it requires an access to memory to read data for execution, etc. Address generation involves calculating memory addresses for instructions that access memory. Scheduling involves the task of determining which instructions are available to be executed and then conveying those instructions and their associated data to the appropriate execution units. The execution stage actually executes the instructions based on information provided by the earlier stages. After the instruction is executed, the results produced are written back either to an internal register or the system memory during the retire stage.

While pipelining produces significant improvements in performance, it has some limitations. In particular, certain instructions in certain floating point implementations are unable to be scheduled until all previous instructions have completed execution and have been retired (i.e., committed to the processor's architectural state). One such instruction is FSTSW (floating point store status word). The FSTSW instruction is configured to access the floating point unit's architectural floating-point status word. As a result, the FSTSW instruction may be referred to as a "bottom executing" instruction because it is not scheduled for execution until all preceding instructions have been executed and retired. Furthermore, instructions occurring after the FSTSW instruction may not be scheduled until after the FSTSW instruction has been scheduled. These problems may be exacerbated when two FSTSW instructions occur near each other in the instruction stream.

Thus, an efficient method for rapidly executing FSTSW-type instructions is desired. In modern x86 floating point software, a significant percentage of FSTSW occurrences are immediately preceded by a floating point compare instructions, e.g., FCOM (floating point compare), FTST (compares top of stack with zero), or FICOM (compare integer instruction). Thus an efficient method for rapidly executing FSTSW instructions when preceded by floating point compare instructions is particularly desirable.

SUMMARY

The problems outlined above may at least in part be solved by a microprocessor configured to rapidly execute FSTSW-type instructions that are immediately preceded by FCOM-type instructions. The microprocessor may improve execution by adding a temporary destination register to FCOM-type instructions. As used herein, "FSTSW-type" instructions include all store status word variants (e.g., FSTSW, FNSTSW, etc.). In addition, "FCOM-type" instructions are used herein to mean any floating point instructions that perform a comparison operation. For example, FCOM (compare real), FCOMP (compare real), FCOMPP (compare real), FICOM (compare integer), FICOMP (compare integer), FTST (test), FUCOM (unordered compare real), FUCOMP (unordered. compare real), FUCOMPP (unordered compare real),: and FXAM (examine real) are all x86 floating point instructions that perform comparison operations.

Furthermore, the term "immediately follows" is used herein to mean that there is no intervening floating point instruction that can change the floating point unit's status word. For example, in the following code sequence, the FSTSW-type instruction is said to immediately follow the FCOM instruction:

FCOM [MEM]
DEC AX
FSTSW BX

The FSTSW-type instruction is said to immediately follow the FCOM [MEM] instruction because the DEC AX instruction will not be conveyed to the floating point unit and thus will have no effect on the floating point status word.

In one embodiment, the FCOM-type instructions write their status flags to the floating point architectural status word register (their normal destination) and the temporary destination register. If an FSTSW-type instruction immediately follows the FCOM-type instruction, the FSTSW-type instruction is converted into a special instruction called an FSTSWEF instruction (i.e., a fast store status word instruction) that is configured to use the temporary register as a source in lieu of the architectural floating point status word register. In some configurations, the temporary register may store only the CC-bits (condition code bits) portion of the floating point status word. Advantageously, FSTSWEF instructions may be scheduled for execution as soon as the temporary storage register written to by the FCOM-type instruction becomes valid.

Generally speaking, in one embodiment a microprocessor configured to rapidly execute FSTSW-type instructions preceded by FCOM-type instructions will include an instruction cache configured to store instructions (both floating point and integer) and a floating point unit. The floating point unit is coupled to receive floating point instructions from the instruction cache. The floating point unit or the microprocessor may include a means for detecting FSTSW-type instructions (e.g., logic or a state machine) that immediately follow FCOM-type instruction s. The floating point unit may also have a temporary storage register configured to store results from the floating point compare type instructions. The floating point unit may also have a means for translating FSTSW-type instructions into FSTSWEF instructions, e.g., a rename unit. The floating point unit may also include a scheduler configured to schedule FSTSW-type instructions to execute only after all older floating point instructions have been retired. The scheduler may similarly be configured to schedule FSTSWEF instructions to execute only after the temporary register (e.g., an Ftemp register) becomes valid.

In some embodiments, the microprocessor may also include an architectural register and one or more execution pipelines. The architectural register is configured to store an architectural floating point status word (FPSW) for the floating point unit, and the execution pipelines are coupled to receive floating point instructions from the scheduler. The pipelines use the temporary register as a source for the condition code (CC) bits for any FSTSWEF instructions and the architectural register as a source for any FSTSW-type instructions. The top of stack (TOS) portion of the FPSW may be read from a third source. For example, the TOS may be copied from a register renaming unit into an unused field of the FSTSWEF instruction and then read from the field when needed. In some embodiments, FSTSWEF instructions may obtain the exception bits portion of the FPSW (i.e., bits 0 through 6 of the x86 FPSW) from the architectural FPSW register. Some implementations may assume these bits are valid.

Subsequent instructions that clear one or more of the sticky bits (i.e., bits 0 through 5 of the x86 FPSW) are executed in a serial fashion (i.e., after the FSTSWEF). However, subsequent instructions that set one or more of the sticky bits may be configured to cause a trap to a microcode routine (i.e., a trap handler). The trap may cause an abort which invalidates all instructions younger than the FSTSWEF, and the trap handler may then reinitiate execution beginning with the next sequential instruction.

In addition to the architectural registers and pipelines, the microprocessor may also include a memory (e.g., a ROM) configured to store a trap handling routine that is invoked when an instruction older than an FSTSWEF instruction changes one or more of the architectural status bits after the FSTSWEF instruction has been scheduled or executed.

A method for rapidly executing FSTSW instructions in a microprocessor is also contemplated. In one embodiment, the method comprises storing the results of FCOM-type instructions to a temporary destination register. In addition, FSTSW-type instructions that immediately follow FCOM-type instructions are transformed into FSTSWEF instructions that utilize the temporary destination register as a source register.

In some embodiments, FSTSW-type instructions are scheduled for execution only after all older floating point instructions have been retired. FSTSWEF instructions, however, may be scheduled after the temporary register is valid. The method may further comprise trapping to a microcode routine when any floating point instructions that are older than a speculatively executed FSTSWEF instruction complete execution (and alters one or more of the sticky bits in the FPSW) before the speculatively executed FSTSWEF instruction is retired.

A computer system configured to rapidly execute FSTSW-type instructions immediately preceded by FCOM-type instructions is also contemplated. In one embodiment, the computer system may comprise a system memory, a communications device for transmitting and receiving data across a network, and one or more microprocessors coupled to the memory and the communications device. The microprocessors may advantageously be configured as described above.

BRIEF DESCRIPTION OF THE DRAWINGS

Other objects and advantages of the invention will become apparent upon reading the following detailed description and upon reference to the accompanying drawings.

Figure 1:
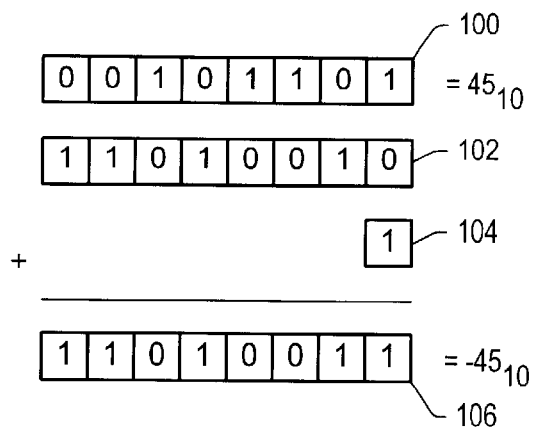
FIG. 1 illustrates an exemplary format for an integer.
Figure 2:
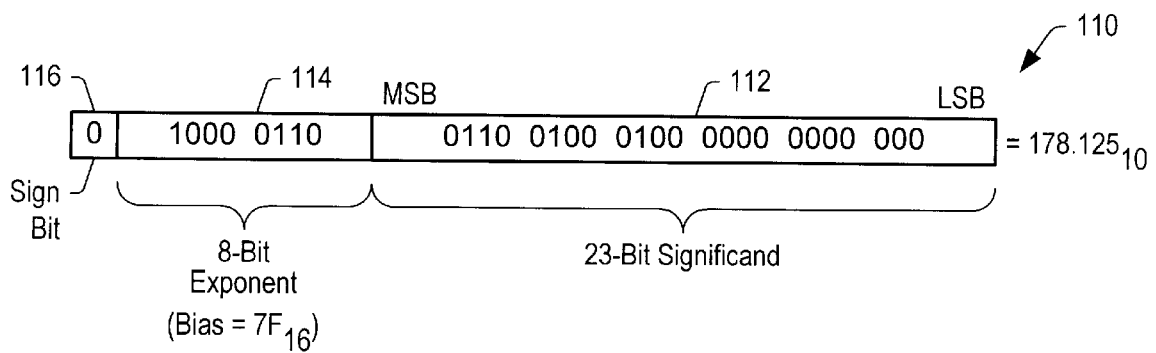
FIG. 2 shows an exemplary format for a floating point value.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Microprocessor

Figure 3:
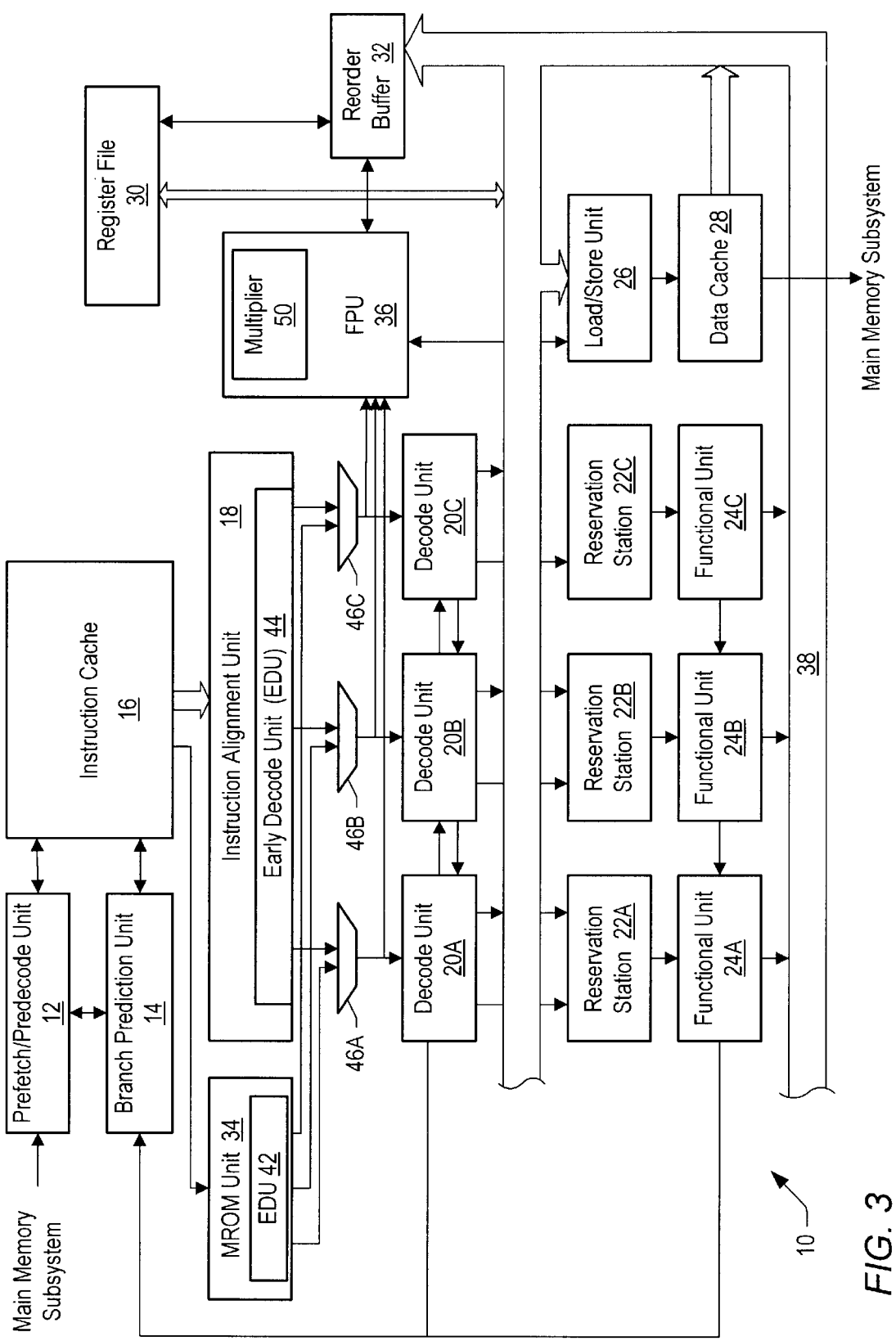
FIG. 3 is a block diagram of one embodiment of an exemplary microprocessor.

Turning now to FIG. 3, a block diagram of one embodiment of a microprocessor 10 is shown. Additional embodiments are possible and contemplated. This embodiment of microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36, which in turn comprises multiplier 50. Before examining in detail one embodiment of FPU 36 that rapidly executes FSTSW-type instructions, the operation of microprocessor 10 will be briefly discussed. Note that elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 116 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42, is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2-way set associative structure having 64-byte lines (a byte comprises 8 binary bits). Instruction cache 16 may additionally employ a way prediction scheme in order to speed access times to the instruction cache. Instead of accessing tags identifying-each line of instructions and comparing the tags to the fetch address to select a way, instruction cache 16 may predict the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits !for each byte of the instructions: a start bit, an end bit, and a functional bit. The predecode bits form tags indicative of the boundaries of each instruction. The predecode tags may also convey: additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will now be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate data byte would have start, end, and functional bits as follows:

| | |
|---|---|
| Start bits | 10000 |
| End bits | 00001 |
| Functional bits | 11000 |

According to one particular embodiment, early identification that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod RNM byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 may employ branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18 and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Note, both instruction alignment unit 18 and MROM unit 34 may each have an early decode unit (EDC) 42 and 44. These units may perform the first steps of the decoding process, e.g., identifying the operand specifiers for each instruction. These units may also begin the process of loading the desired operands from memory (if necessary).

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (floating point, MMX, and 3DX instructions). In one embodiment of microprocessor 10, up to three floating point/MMX/3DX instructions per clock cycle may be conveyed to floating point unit 36. As note above, the instructions may come from MROM unit 34 (microcode instructions) or instruction alignment unit 18 (fast path instructions).

Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 3, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each of decode units 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a pre-cache load/store buffer having twelve storage locations for data and address information for pending loads or stores and a post-cache load/store buffer having 32 entries. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which, causes the data transfer but no other operation. Additionally, load/store unit 26 may: include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to 64 kilobytes of data in an 2-way set associative structure. Similar to instruction cache 16, data cache 28 may employ a way prediction mechanism. It is understood that data cache 28 may be implemented in a variety of specific memory configurations, including a set associative configuration.

Floating Point Unit

Figure 4:
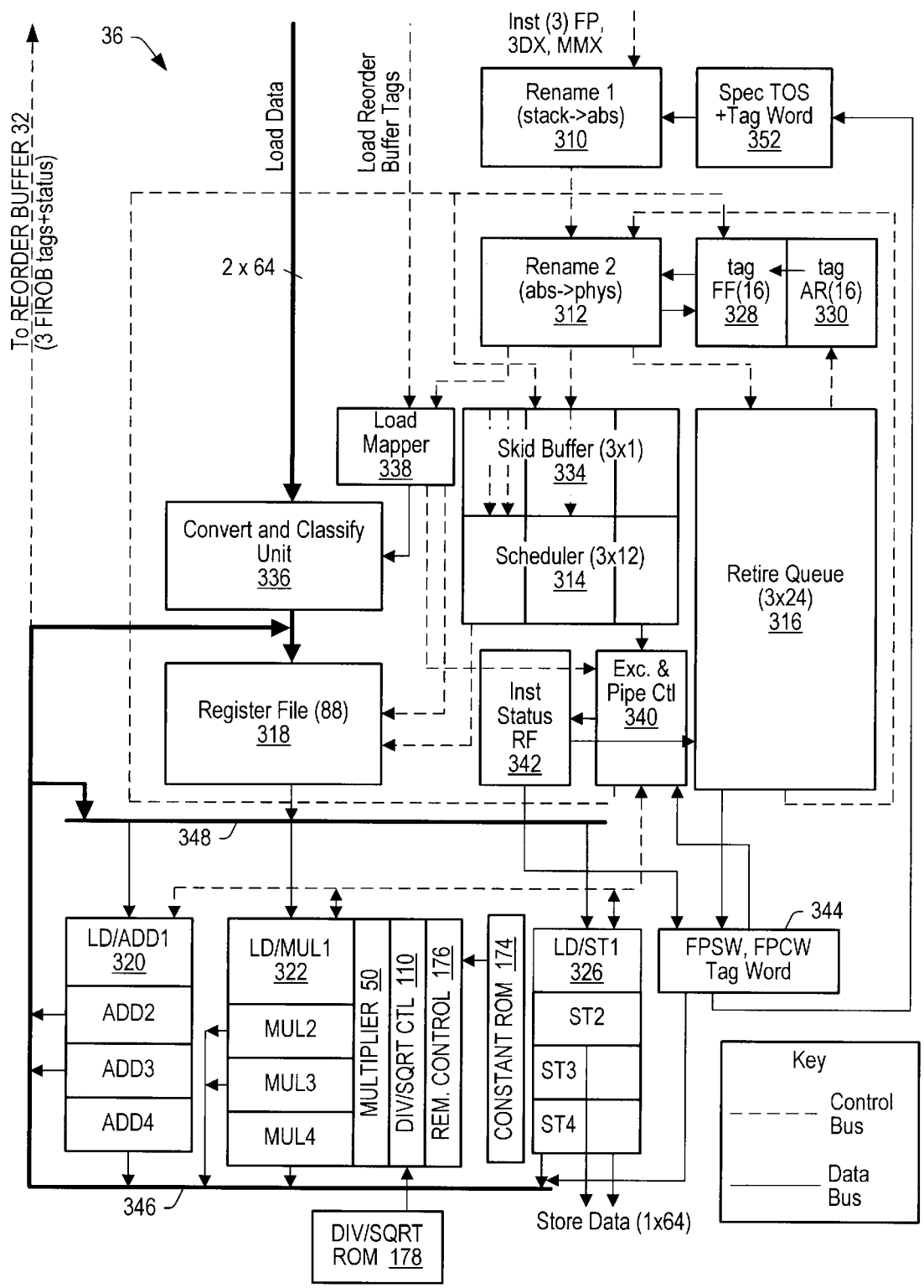
FIG. 4 is a block diagram of one embodiment of the floating point unit from the microprocessor of FIG. 3.

Turning now to FIG. 4, details of one embodiment of FPU 36 are shown. Other embodiments are possible and contemplated. FPU 36 is a high performance out-of-order execution unit capable of accepting up to three new instructions per clock cycle. The three instructions may be any combination of x86 floating point instructions, MMX instructions, or 3DX instructions. MMX and 3DX instructions are extensions to the standard x86 instruction set. One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, a scheduler 314, a retire queue 316, a register file 318, a load/add instruction pipeline 320, a load/multiply instruction pipeline 322, a load/store instruction pipeline 326, a skid buffer 334, a convert and classify unit 336, and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, scheduler 314, and load mapper 338. Convert and classify unit 336 is also coupled to load mapper 338, which in turn is coupled to execution and pipe control unit 340 along with instruction status register file 342 and scheduler 314. Register file 318 receives inputs from convert and classify unit 336, load mapper 338 and scheduler 314, and outputs data to source operand bus 348. Source operand bus 348 is in turn coupled to instruction pipes 320, 322, and 326. Finally, instruction pipes 320, 322, and 326, and floating point status/control/tag words 344 are all coupled to result bus 346. While floating point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipe control unit 340, or retire queue 316.

Rename-1 unit 310 receives up to three instructions per clock cycle. As previously noted, these may be any combination of floating point, MMX, or 3DX instructions. Rename-1 unit 310 converts stack-relative register operands into absolute register operands. The x86 instruction set and architecture defines eight floating point registers that are accessed in a stack-like manner (i.e., relative to a top-of-stack pointer). For instructions with memory operands, e.g., FLD instructions (floating point load) a designated destination register can be assigned. Rename-1 unit 310 also assigns each instruction to one of three instruction pipelines, either load/store, pipeline 326, add pipeline 320, or multiply pipeline 322.

Rename-2 unit 312 performs true register renaming. Upon receiving the instructions from rename-1 unit 310, rename-2 unit 312 reads three register tags from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. Note, of the sixteen registers that define FPU 36's state (architectural or speculative), eight are architectural registers (i.e., floating point stack or MMX registers) and eight are micro-architectural registers (i.e., registers that store internal state information that is not generally accessible to the programmer). The old destination register tags are then read from the tag future file 328 and written to the tail of the free list Finally, tag future file 328 is updated by storing tags for the new destination registers.

Memory operands may be handled by assigning them the same register tag as the destination register. This is because load data will be converted and directly written into the destination register when it is received from load/store pipeline 326. In the case of an FLD instruction no further execution is generally required (excluding certain exceptional cases, e.g., the load of an SNaN which has to be converted to a QNaN), although the FLD instruction is still assigned to an execution pipeline for the purpose of handling exceptions and signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to scheduler 314, where the three instructions are allocated a "line" of storage. If scheduler 314 is full, the instructions may be stored in skid buffer 334 until such time as there is room within scheduler 314. After receiving the three instructions, scheduler 314 snoops result bus 346 and source operand bus 348. Concurrently with allocating the line of storage and snooping, retire queue 316 allocates one entry for each instruction. The entries store the destination register tags, the absolute destination register number, and the old destination register number. Additional information may also be included, e.g., information that may be needed to update the architectural state at retire time.

On the cycle following their entry into scheduler 314, the instructions are available for scheduling. Scheduler 314 (also referred to herein as schedule unit 314) examines all of the stored instructions and issues the oldest instructions which meet the following criteria: (1) the instruction pipe to which the instruction has been assigned is available, (2) the result bus for that instruction pipe will be available on the clock cycle in which the instruction will complete (this is dependent upon the latency of the particular instruction), and (3) the instruction's source registers and or memory operands are available. In this embodiment, scheduler 314 may schedule up to three instructions per clock cycle. As used herein, scheduling refers to conveying instructions from the scheduler to their corresponding execution pipelines. Each of the three instruction pipes 320, 322, and 326 may accept a new instruction every clock cycle. Other embodiments capable of scheduling four or more instructions are also possible and contemplated.

Once all three entries in a line are scheduled, that line is free to be compacted out of scheduler 314. When the instructions are conveyed from scheduler 314 to their respective instruction execution pipeline, their source operands are read. In some cases, the source data will come from a register, while in other cases the source data will come from a "bypass". A bypass refers to the practice of result forwarding. Result forwarding involves conveying the results from a recently executed instruction directly to other instructions that depend upon that result. Using result forwarding allows the result to be used in subsequent instructions without having to wait for the result to be stored in a register and then read from the same register.

Each instruction execution pipe 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each instruction pipe may begin performing the appropriate computation.

In the embodiment shown in the figure, instruction pipe 320 is configured to perform load and addition operations, instruction pipe 322 is configured to perform load and multiplication operations, and instruction pipe 326 is configured to perform load and store operations. Both instruction pipes 320 and 322 may be configured to perform certain MMX instructions. Instruction pipe 322, which comprises multiplier 50, may also be configured to perform iterative calculations that involve multiplication, e.g., reciprocal operations, division operations, and square root operations, under the control of control unit 110, division/square root ROM 178, and, if a remainder is called for, remainder control unit 176. Constant ROM 174 is a read only memory configured to store a plurality of constants for instructions such as FLDPI (load constant), for transcendental computations, for self-checking, and for certain special and exceptional results. Division/square root ROM 178 is a read only memory which-stores constants used to determine initial values for division and square root computations and constants returned by certain 3DNow! instructions. Control unit 110 provides sequence information for division and square root functions. Note, in some embodiments control unit 110 may be part of execution and pipe control unit 340.

In some cases, instruction operands or the results generated by executing an instruction may be too small to fit within the operand or result's standard data format. These numbers are referred to as "denormals". While normalized floating point values have a non-zero exponent and a one in the most significant bit of the significand, i.e., the bit directly to the left of the binary radix point (e.g., 1.001010 . . . ), denormals are represented with a zero exponent and a zero in the most significant bit of the significand (e.g., 0.000101 . . . ). Denormal load data is detected and tagged by convert and classify unit 336. Denormal results generated by during execution within instruction pipes 320, 322, and 326 are tagged when they are generated. Execution and pipe control unit 340 detects the presence of the denormal tags and calls an appropriate microcode routine from MROM 34 to handle the denormal data.

At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data may be sent to the load/store unit 26, or to both register file 318 and load/store unit 26. The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significand. Similarly, infinity data types are typically represented with an exponent comprising all asserted ones. A quiet NaN ("QNaN") is generated whenever a floating point instruction causes an invalid operation, e.g., a square root operation on a negative number. A signaling NaN ("SNaN"), unlike a quiet NaN, generates an exception when used. Signaling NaNs are not, generated by FPU 36 and are typically only used by programmers to signal particular error conditions. The table below illustrates the typical characteristics of each data type for x86 compatible floating point units (wherein "x" represents either a one or a zero):

| Sign | Exponent | Significand | Value |
|------|----------|-------------|-------|
| X | $00 \ldots 00_2$ | $0.00 \ldots 00_2$ | Zero |
| X | $11 \ldots 11_2$ | $1.00 \ldots 00_2$ | Infinity |
| X | $11 \ldots 11_2$ | $1.1xx \ldots xx_2$ | QNaN |
| X | $11 \ldots 11_2$ | $1.0xx \ldots xx_2$ | SNaN |
| X | $00 \ldots 00_2$ | $0.xx \ldots xx_2$ | Denormal |

MMX data types are 64 bits wide and comprise either eight packed 8-bit bytes, four packed 16-bit words, or two packed 32-bit double-words. MMX data types may be detected by the MMX opcodes which precede them. Normal data types are standard floating point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a significand in the format (i.ff . . . ff) of 0.11 . . . 11 is an unsupported value (wherein. "f" represents a fractional mantissa bit and "i" represents an integer bit. Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significand portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies, the data and is routed in parallel to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a physical register tag. The physical register tag indicates which data register within register file 318 the corresponding data is to be loaded into.

Execution and pipe control unit 340 tracks the status of each stage in instruction pipes 320, 322, and 326. Execution and pipe control unit 340 contains timing information enabling it to determine the future availability of each instruction pipe. For example, when an FMUL (floating point multiply) instruction begins execution in multiplication instruction pipe 322, control unit 340 uses its stored timing information to notify scheduler 314 that the result will be available for output on result bus 346 four clock cycles later. This timing information allows scheduler 314 to efficiently schedule instruction for execution in instruction pipes 320, 322, and 326. Control unit 340 also tracks the status of each pipe stage, receiving and prioritizing exceptions from instruction pipes 320, 322, and 326.

FPU status word, control word, and tag word (collectively, words 344) are stored within retire queue 316 and indicate which of the status and control registers within register file 318 contain the FPU's current architectural state. For example, in one embodiment register file 318 may comprise 88 registers, i.e., 16 registers to store the current architectural state of FPU 36 (see below), and 72 speculative registers to store the speculative state of FPU 36. Of the 72 speculative registers, 16 store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., they are not accessible to the programmer and store only internal state information. In one embodiment, each register in register file 314 is 90 bits long, with 87 bits providing storage for internal format data (e.g., one sign bit, 18 exponent bits, and a 68-bit significand) and 3 class bits.

Instruction status register file 342 stores information for execution and pipe control unit 340. As a result of instructions executing out of order in FPU 36, exceptions that occur within instruction pipes may need to be stored until the instructions generating them are the next to be retired. Retire queue 316 reads instruction status register file 342 when it retires instructions and updates the architectural floating point status word (FPSW) and floating point control word (FPCW) and tag word (collectively, 344) accordingly. This information is conveyed to rename-1 unit along with the current speculative top of stack 352 and on result bus 346.

Figure 5:
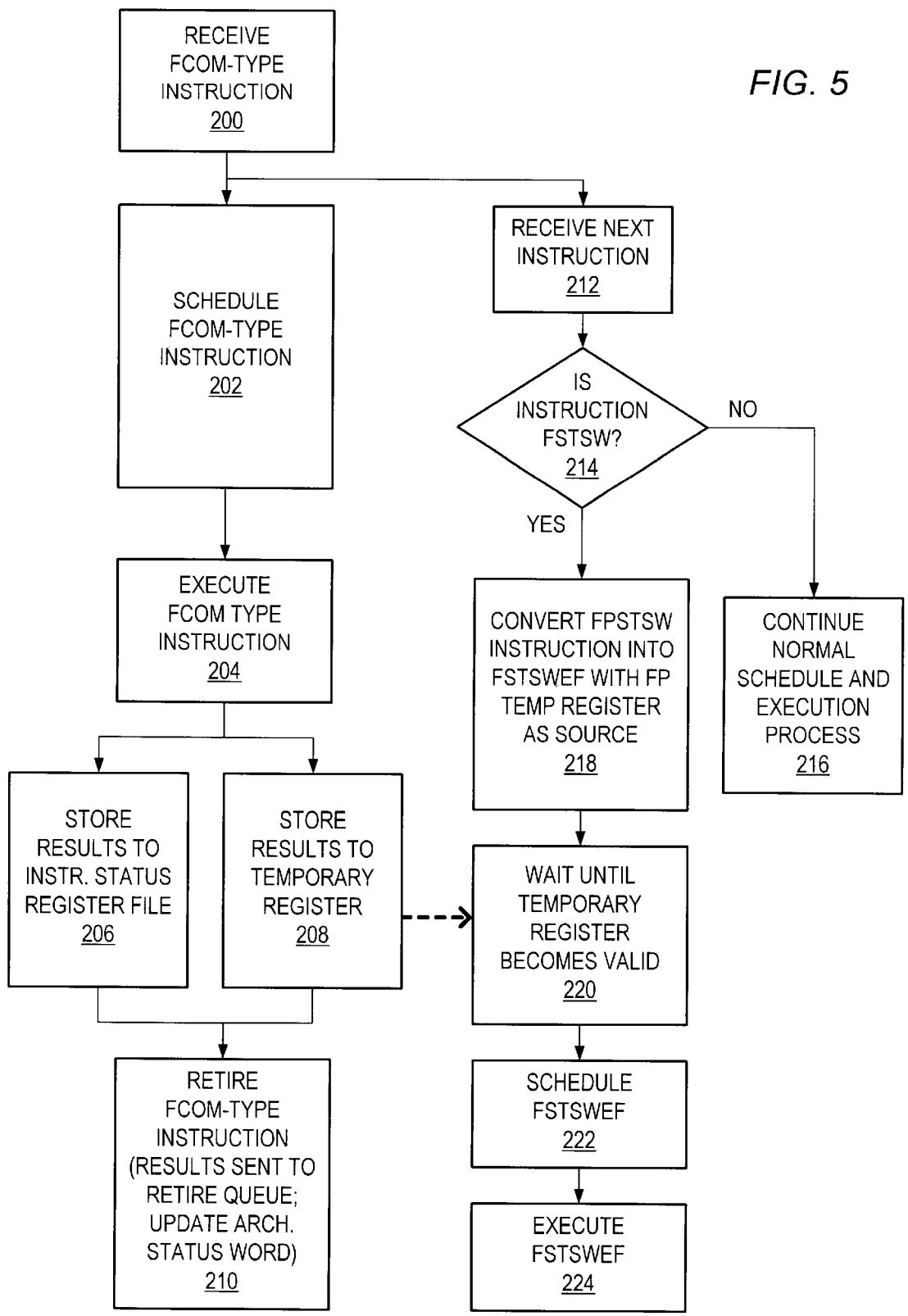
FIG. 5 is a flowchart of one embodiment of a method for rapidly executing FSTSW-type instructions.

Method for Rapidly Executing FSTSW—FIG. 5

FIG. 5 is a flowchart illustrating one embodiment of a method for rapidly executing FSTSW-type instructions that are immediately preceded by FCOM-type instructions. First, the floating point unit receives an FCOM-type instruction (step 200). Once received, the FCOM-type instruction is stored in the scheduler where it waits until it is ready to be executed (e.g., until its memory operands have arrived from memory). Once the FCOM-type instruction is ready to be executed, it is scheduled by the scheduler (step 202). The corresponding execution pipeline (e.g., LD/ADD1 pipeline 320 in FIG. 4) then executes the instruction (step 204). The FCOM-type instruction produces "change" information for each condition code bit (i.e., "clear", "set", or "pass through"). The change information is stored in the instruction status register file. At, retire time, the stored change information is retrieved and sent to the retire queue, which then applies the change information to the architectural status words (see FPSW in FIG. 4) (step 206) and a temporary floating point storage register (step 208). At instruction completion time, FCOM-type instructions send CC-change information and exception information to the status register life while at the same time storing the CC bits to the temporary register. This temporary floating point storage register is referred to herein as the Ftemp register. The FCOM-type instruction is then retired (step 210), and its corresponding entry in the retire queue (see retire queue 316 in FIG. 4) is cleared.

In parallel with scheduling the FCOM-type instruction (step 202), the floating point unit may receive the next instruction in program order that immediately follows the FCOM-type instruction (step 212). Once the instruction immediately following the FCOM-type instruction is received (step 212), the instruction is examined to determine whether or not the instruction is an FSTSW-type instruction (step 214). If it is not an FSTSW-type instruction, the instruction is stored in the scheduler and executes in a normal fashion (step 216). If, however, the instruction is an FSTSW-type instruction, then it is converted into a special type of instruction called an FSTSWEF (fast floating point store status) instruction (step 218). The FSTSWEF instruction operates similarly to the standard FSTSW-type instruction, except that it is defined to use the Ftemp register as a source operand (for the CC-bit component of the status word) in lieu of using the architectural floating point status word 344. The FSTSWEF instruction is stored in the scheduler and waits until the Ftemp register becomes valid (step 220). As indicated in the figure, the Ftemp register becomes valid when the preceding FCOM-type instruction completes execution and stores its results therein (step 208). Once the Ftemp register is valid, the scheduler may schedule the FSTSWEF instruction for execution (step 222). The FSTSWEF is scheduled and executes in the same fashion as non-bottom executing or normal (e.g., non-FLDW) instructions.

Note the flowchart illustrated in the figure is for explanatory purposes and is not meant to be limiting. Depending upon the exact implementation, the steps may be performed in a different order and may be performed using a different number of clock cycles than shown in the figure. For example, the floating point unit may be configured to receive multiple instructions per clock cycle. Thus, the FCOM-type instruction and the next instruction may be received in the same clock cycle. Similarly, steps 200–202 and 212–218 may be combined and may be performed in a single clock cycle. Additional steps may also be added.

In some embodiments, the detection of whether an FSTSW-type instruction immediately follows an FCOM-type instruction may be performed earlier (i.e., outside the floating point unit). For example, early decode units 42–44 may be configured to detect when FSTSW-type instructions immediately follow FCOM-type instructions. The early decode units may then make the FSTSWEF substitution accordingly before the instructions are routed to the floating point unit.

Figure 6:
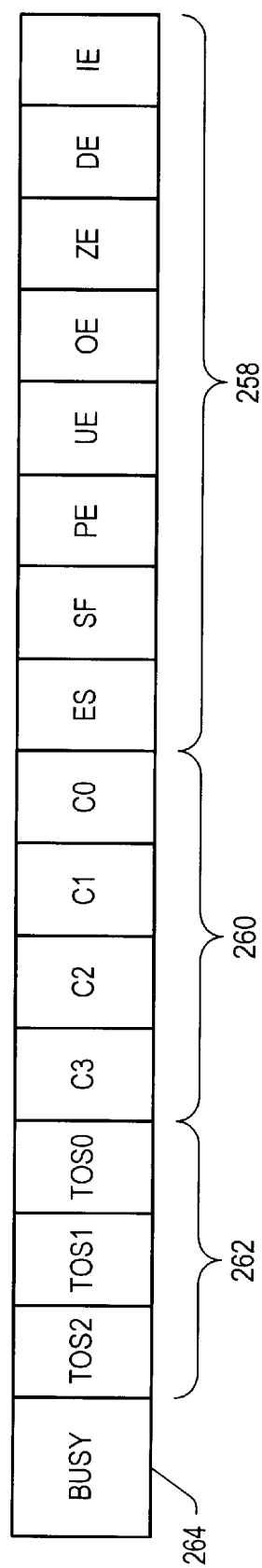
FIG. 6 is a diagram of one embodiment of the contents of a temporary register configured to store at least part of a speculative floating point status word.

Floating Point Status Word (FPSW)—FIG. 6

Depending upon the configuration of the floating point unit, some special considerations may be useful when implementing the method disclosed above. These special considerations relate to how the data stored in the Ftemp register is generated.

FIG. 6 shows one embodiment of a floating point status word. In this embodiment, floating point status word 344 comprises a plurality of exception summary bits 258, condition code ("CC") bits 260, top of stack (TOS) bits 262, and a busy bit 264. Exception summary bits 258 include invalid operation (IE), denormalized operand (DE), zero divide (ZE), overflow (OE), underflow (UE), precision exception (PE), stack fault (ST), and error summary status (ES). As noted above, all or just a portion of the floating point status word (e.g., the CC bits) may be may be read from the Ftemp register.

In some embodiments of floating point unit 36, exception summary bits 258 may pose a problem for the FSTSWEF instruction. As noted above, in some embodiments the sticky bits are read from the architectural floating point status word. These bits may be incorrect if there is an instruction that (1) is older than. the FSTSWEF, (2) has not yet retired, and (3) alters one or more of the sticky bits. In some embodiments, instructions that may alter the sticky bits and that occur relatively infrequently, may be implemented using microcode and may cause an abort (e.g., by intentionally mispredicting the target of a branch instruction) in order to serialize the. microprocessor when the sticky bits are altered. In some implementations, these instructions may already be identified as "serialized" instructions upon decoding and thus may not require an additional trap after retiring. Another method for dealing with this potential issue is to generate an abort and a subsequent trap after the instruction has retired. As noted above, this method may be used for a subset of instructions (e.g., those that set the sticky bits), while the previous method of serialization upon decoding may be used for the remaining instructions (e.g., those that clear the sticky bits). Note, as used herein a trap refers to the process of asserting a particular condition, allowing the instruction that caused the condition to retire, and then calling a trap handler routine before the next instruction.

Condition code bits 260 are similar to standard flag bits in a microprocessor and are generated by the execution of FCOM-type instructions. Thus, condition code bits 260 may be stored in the temporary register by the executing FCOM-type instructions.

TOS bits 262 indicate which register in the floating point register stack is at the top of the stack. In some embodiments, TOS bits 262 directly indicate a particular register, while in other embodiments the TOS bits 262 point to a particular pointer stored within a register map. The pointer in the register in turn points to the actual physical register in the floating point unit. A speculative version of TOS bits 262 may accompany FSTSWEF instructions when they are sent to the floating point unit by the early decode units 42–44. To ensure this speculative TOS value is available to FSTSWEF instructions when they execute, each instruction in the scheduler may have storage in the scheduler for its speculative TOS value (e.g., three bits). The stored speculative TOS may then be copied from the scheduler to the Ftemp register when the FSTSWEF instructions are scheduled or when they are actually executed.

Busy bit 264 reflects the contents of the error summary status (ES) bit. The error summary status (ES) bit is simply a logical OR of all of the sticky bits. Since the sticky bits are read from the architectural status word,. the ES bit is obtained at the same time. The sticky bits themselves are a function of (i) the exception information conveyed by- each instruction to the retire queue, and (ii) the mask bits in the control word accumulated over one or more instructions until explicitly cleared.

Other embodiment-specific features may be implemented in floating point unit 36 to further ensure the efficient operation of the new FSTSWEF instruction. These features are described below and refer back to the embodiment of floating point unit 36 illustrated in FIG. 4.

For example, rename1 unit 310 may be configured to assign FCOM-type instructions a valid destination register within register file 318 that acts as the Ftemp register. The FCOM-type instruction will store a copy of its results (i.e., the CC-bits explained above) in this register when executed. Rename1 unit 310 may be configured to receive and route a 3-bit TOS indicator (corresponding to the FCOM-type instruction) to rename2 unit 312. Rename1 unit 310 may be further configured to assign the Ftemp register as a source for any FSTSWEF instructions.

Within rename2 unit 312, an additional bit (referred to herein as the FSTSWEF_OK bit) may be associated with the Ftemp register. The FSTSWEF_OK bit is set when an FCOM-type instruction passes through Rename 2 (see FIG. 3). The FSTSWEF_OK bit is cleared by aborts and by any valid non-FCOM-type instruction-that is passing through Rename 2. If another non-FCOM-type instruction is in the same scheduler line as the FCOM-type instruction, but in a younger position, then the FSTSWEF_OK bit is cleared. If there are more than one FCOM-type instruction within one line in the scheduler, then the FSTSWEF_OK bit can be set provided that the last instruction in the line is an FCOM-type instruction.

As previously noted, a number of different configurations may be used to implement the FSTSW-type-to-FSTSWEF instruction transformation. In one embodiment, the FSTSW-type instruction may be microcoded with special restrictions. For example, FSTSW-type instructions may be configured to load into the scheduler as the first and only instruction in a scheduler row. When an FSTSW-type instruction is received by rename2 unit-312, rename2 unit 312 reads the FSTSWEF_OK bit. If the FSTSWEF_OK bit is set, the FSTSW-type instruction is translated into an FSTSWEF instruction. However, if the FSTSWEF_OK bit is clear, the FSTSW-type instruction executes as a standard FSTSW-type instruction.

Figure 7:
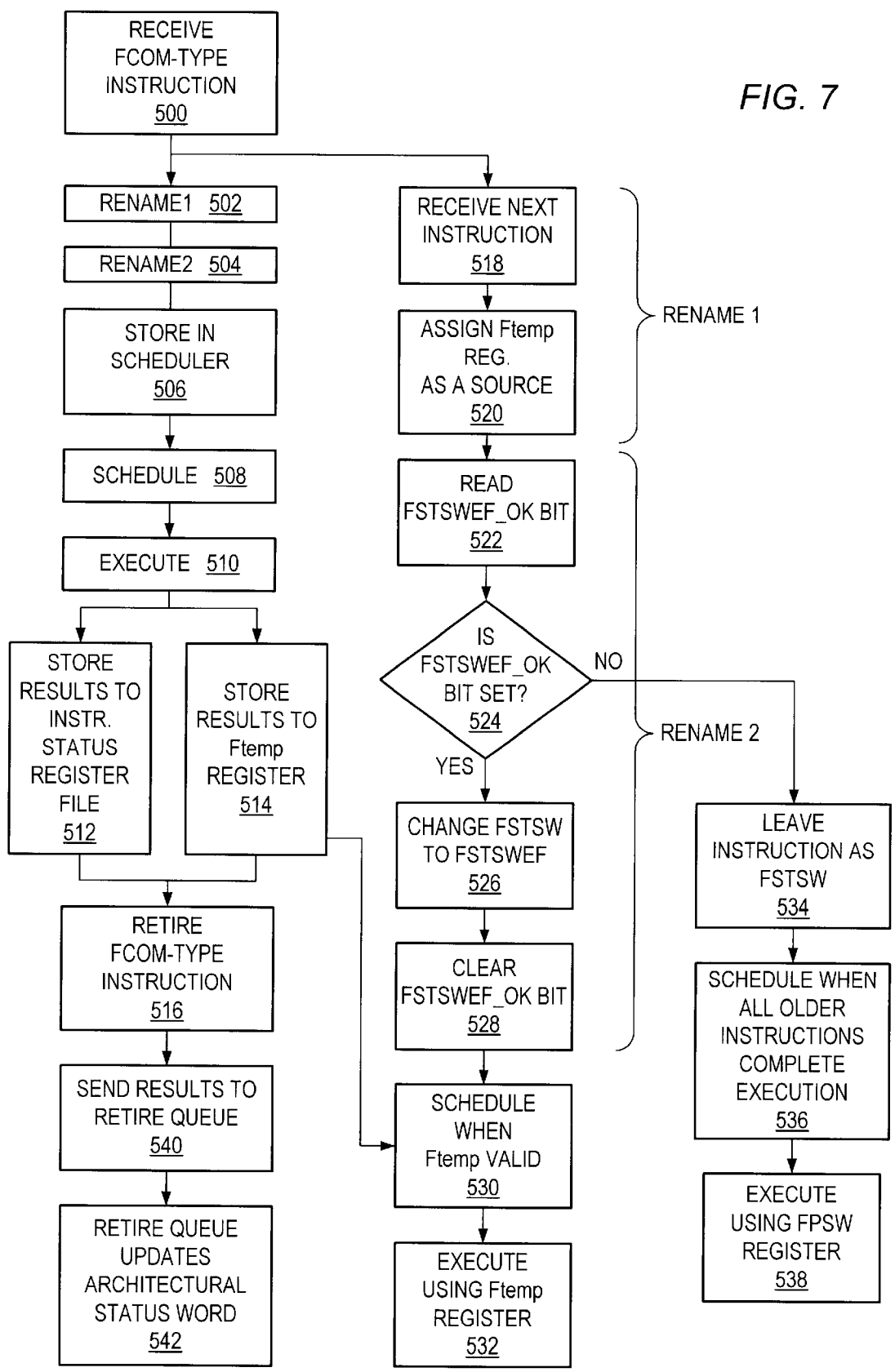
FIG. 7 is a flowchart of another embodiment of a method for rapidly executing FSTSW-type instructions.

FIG. 7 is a flowchart illustrating another embodiment of a method to rapidly execute FSTSW-type instructions. As in the previous embodiment of FIG. 5, an FCOM-type of instruction is received by the floating point unit (step 500). The FCOM-instruction proceeds through rename1 unit 310 (step 502), rename2 unit 312 (step 504), and is stored in scheduler 314 (step 508). When the instruction is scheduled, it executes (step 510) and stores its results to instruction status register file 342 the architectural floating point status word (step 512) and the, Ftemp register (step 514). It then retires (step 516), at which time the results (e.g., CC change indicators and exception signals) are sent to the retire queue 316 (step 540), which in turn updates the architectural status word accordingly (step 542).

The next instruction is received (step 518) either in the same clock cycle as the FCOM-type instruction, or shortly thereafter. Assuming the instruction is an FSTSW-type instruction, it enters rename1 unit 310 and is assigned the Ftemp register as a source (step 520). The FSTSW-type instruction proceeds to rename2 unit 312, where the FSTSWEF_OK bit is read (step 522). If the FSTSWEF_OK bit is clear (step 524), then the FSTSW-type instruction is left as an FSTSW-type instruction (step 534). As a normal FSTSW-type instruction, it is stored in the scheduler and scheduled as a bottom-executing instruction, i.e., when all older instructions are retired (step 536). The FSTSW-type instruction is executed using the architectural FPSW (step 538).

If, however, the FSTSWEF_OK bit is set (step 524), then the FSTSW-type instruction is recast as an FSTSWEF instruction (step 526). Rename2 unit 314 also clears the FSTSWEF_OK bit (step 528). The FSTSWEF instruction is stored in scheduler 314 and is scheduled when the Ftemp register becomes valid (step 530). The FSTSWEF instruction is then executed using the Ftemp register as a source (step 532).

While the embodiments described herein focus on the x86 instruction set, other embodiments are contemplated that may adapt the methods described above for use in microprocessors that execute other instruction sets with instructions similar to FSTSW-type and FCOM-type instructions.

Figure 8:
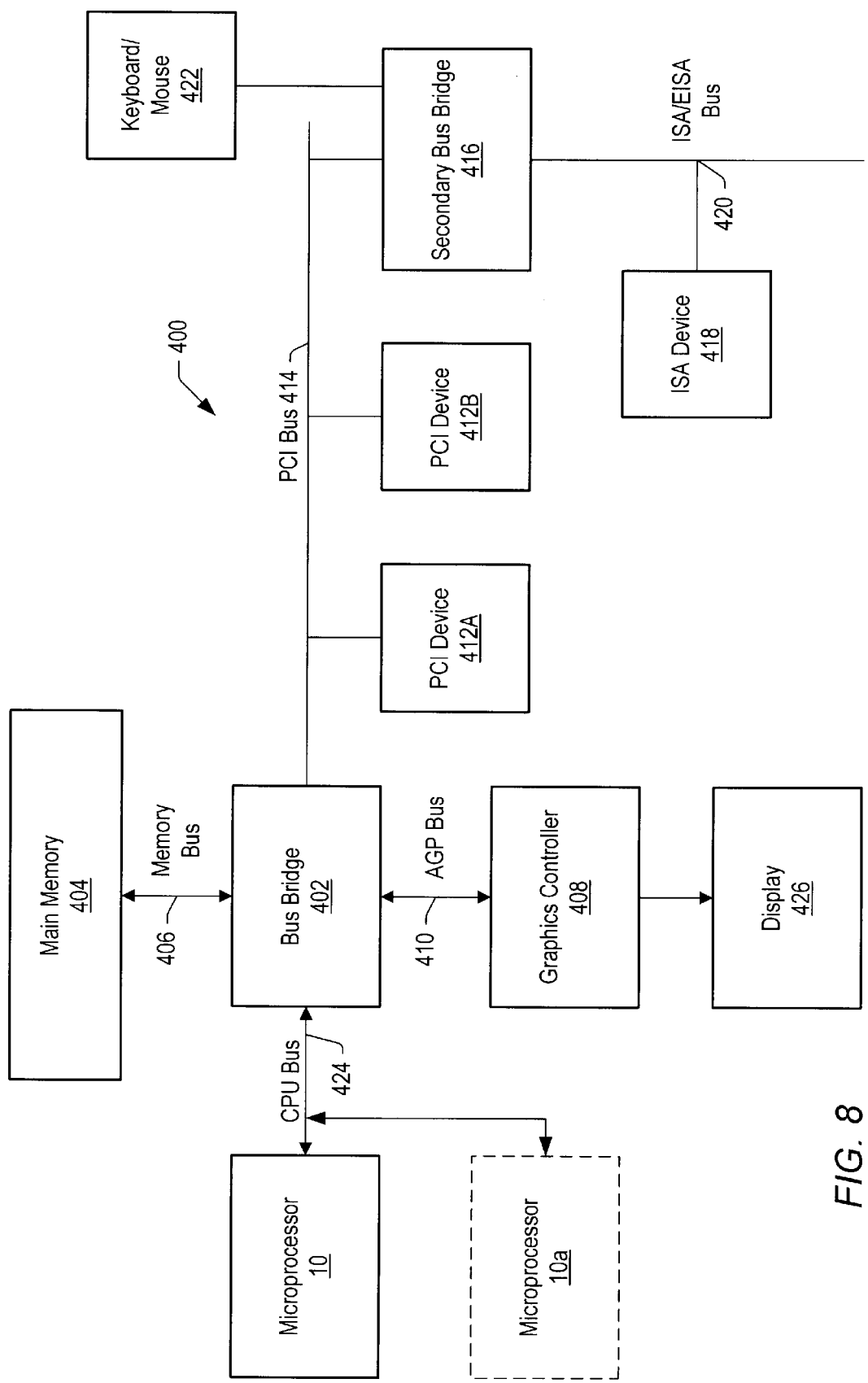
FIG. 8 is a block diagram of one embodiment of a computer system configured to utilize the microprocessor of FIG. 3.

Exemplary Computer System—FIG. 8

FIG. 8 shows a block diagram of one embodiment of a computer system 400 including microprocessor 10. Microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a communications device (e.g., a modem or a network card), a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g. microprocessor 10a shown as an optional component of computer system 400). Microprocessor 10a may be similar to microprocessor 10. More particularly, microprocessor 10a may be an identical copy of microprocessor 10. Microprocessor 10a may share CPU bus 424 with microprocessor 10 or may be connected to bus bridge 402 via an independent bus.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A microprocessor configured to rapidly execute floating point store status word (FSTSW) type instructions, the microprocessor comprising:

an instruction cache configured to store floating point instructions and integer instructions; and a floating point unit coupled to receive said floating point instructions from said instruction cache, wherein said floating point unit comprises:

a means for detecting FSTSW-type instructions that immediately follow floating point compare (FCOM) type instructions;

a temporary storage register configured to store results from said FCOM-type instructions; and a means for translating FSTSW-type instructions into fast floating point store status word (FSTSWEF) instructions, wherein said FSTSW-type instructions are scheduled to execute in a serialized fashion, and wherein said FSTSWEF instructions are scheduled to execute in an out-of-order fashion.

2. The microprocessor as recited in claim 1, wherein said floating point unit further comprises a scheduler configured to store and schedule for execution a plurality of floating point instructions awaiting execution, wherein said scheduler is configured to schedule said FSTSW-type instructions for execution only after all older floating point instructions have retired, and wherein said scheduler is configured to schedule said FSTSWEF instructions for execution only after the temporary register becomes valid.

3. The microprocessor as recited in claim 2, wherein said floating point unit further comprises:

an architectural register configured to store an architectural floating point status word for said floating point unit; and one or more execution pipelines coupled to receive said plurality of floating point instructions from said scheduler, wherein said one or more execution pipelines are configured to use said temporary storage register as a source for any FSTSWEF instructions executed, and wherein said one or more execution pipelines are configured to use said architectural register as said source for any FSTSW-type instructions executed.

4. The microprocessor as recited in claim 2, wherein said floating point unit further comprises:

an architectural register configured to store an architectural floating point status word for said floating point unit; and one or more execution pipelines coupled to receive said plurality of floating point instructions from said scheduler, wherein said one or more execution pipelines are configured to use said temporary storage register as one of a plurality of sources for any FSTSWEF instructions executed, and wherein said one or more execution pipelines are configured to use said architectural register as said source for any FSTSW-type instructions executed.

5. The microprocessor as recited in claim 3, wherein said floating point unit further comprises a memory configured to store a trap handling routine, wherein said trap handling routine is called by said floating point unit if any floating point instructions that are older than a speculatively executed FSTSWEF instruction complete execution and alter the architectural floating point status word before the speculatively executed FSTSWEF instruction is retired.

6. The microprocessor as recited in claim 1, wherein said means for translating comprises a rename unit configured to store an indicator bit indicative of whether FSTSW-type instructions should be translated into FSTSWEF instructions.

7. The microprocessor as recited in claim 3, wherein said floating point unit is configured to invalidate any speculatively executed FSTSWEF instructions that have not been retired if any floating point instructions that are older than said speculatively executed FSTSWEF instructions complete execution and alter the architectural floating point status word before the speculatively executed FSTSWEF instruction is retired.

8. The microprocessor as recited in claim 1, wherein said microprocessor is configured to execute x86 integer and floating point instructions, and wherein said FCOM-type instructions are selected from the group comprising: FCOM (compare real), FCOMP (compare real), FCOMPP (compare real), FICOM (compare integer); FICOMP (compare integer), FTST (test), FUCOM (unordered compare real), FUCOMP (unordered compare real), FUCOMPP (unordered compare real), and FXAM (examine real) instructions.

9. A microprocessor configured to rapidly execute floating point store status word (FSTSW) type instructions, the microprocessor comprising:
    an instruction cache configured to store floating point instructions and integer instructions; and
    a floating point unit coupled to receive said floating point instructions from said instruction cache, wherein said floating point unit comprises:
        a means for detecting FSTSW-type instructions that immediately follow floating point compare (FCOM) type instructions;
        a temporary storage register configured to store results from said FCOM-type instructions; and
        a means for translating FSTSW-type instructions into fast floating point store status word (FSTSWEF) instructions, wherein said FSTSW-type instructions are scheduled to execute only after all older floating point instructions have retired, and wherein said FSTSWEF instructions are scheduled to execute only after the temporary storage register becomes valid.

10. A method for rapidly executing floating point store status word (FSTSW) type instructions, the method comprising:
    detecting FSTSW-type instructions;
    transforming FSTSW-type instructions that immediately follow FCOM-type instructions into fast floating point store status word (FSTSWEF) instructions;
    serializing instructions before and after FSTSW-type instructions; executing the FSTSW instructions in an in-order fashion; and executing the FSTSWEF instructions in an out-of-order fashion.

11. The method as recited in claim 10, further comprising storing results from the FCOM-type instructions to a floating point status word.

12. The method as recited in claim 11, wherein a particular FSTSW-type instruction is said to immediately follow a particular FCOM-type instruction if there are no instructions between the particular FSTSW-type instruction and the particular FCOM-type instruction that have an ability to alter said floating point status word.

13. The method as recited in claim 10, wherein a particular FSTSW-type instruction is said to immediately follow a particular FCOM-type instruction if there are no floating point instructions between the particular FSTSW-type instruction and the particular FCOM-type instruction.

14. The method as recited in claim 10, further comprising:
    scheduling FSTSW-type instructions for execution only after all older floating point instructions have been executed; and
    scheduling FSTSWEF instructions only after the temporary register is valid.

15. The method as recited in claim 11, further comprising trapping to a microcode routine when any floating point instructions that are older than a speculatively executed FSTSWEF instruction complete execution and alter the floating point status word before the speculatively executed FSTSWEF instruction is retired.

16. The method as recited in claim 15, wherein said microcode routine is configured to invalidate said speculatively executed FSTSWEF instruction.

17. The method as recited in claim 10, further comprising:
    storing top of stack information for FSTSW-type instructions; and
    using said stored top of stack information to fill at least part of said temporary register when said FSTSWEF instructions execute.

18. The method as recited in claim 10, further comprising scheduling a single FSTSWEF instruction per clock cycle without scheduling any other floating point instructions in the same clock cycle.

19. A computer system comprising:
    a main memory;
    a communications device; and
    a first microprocessor coupled to said main memory and said communications device, wherein said microprocessor comprises:
        an instruction cache configured to store floating point instructions and integer instructions; and
        a floating point unit coupled to receive said floating point instructions from said instruction cache, wherein said floating point unit comprises:
            a means for detecting store status word (FSTSW) type instructions that immediately follow floating point compare (FCOM) type instructions;
            a temporary storage register configured to store results from said FCOM-type instructions; and
            a means for translating FSTSW-type instructions into fast floating point store status word (FSTSWEF) instructions, wherein said FSTSW-type instructions are scheduled to execute in a serialized fashion, and wherein said FSTSWEF instructions are scheduled to execute in an out-of-order fashion.

20. The computer system as recited in claim 19, further comprising a second microprocessor coupled to said first microprocessor.

* * * * *